United States Patent
Longbottom et al.

(10) Patent No.: US 7,099,661 B1
(45) Date of Patent: Aug. 29, 2006

(54) RISK-TIME PROTECTION BACKUP SYSTEM

(75) Inventors: Jeff U. Longbottom, San Pedro, CA (US); Chandra S. Kotaru, Redondo Beach, CA (US)

(73) Assignee: The DirecTV Group, Inc., El Segundo, CA (US)

(*) Notice: Subject to any disclaimer, the term of this patent is extended or adjusted under 35 U.S.C. 154(b) by 449 days.

(21) Appl. No.: 10/192,963

(22) Filed: Jul. 10, 2002

(51) Int. Cl.
*H04Q 7/20* (2006.01)
*H04L 12/54* (2006.01)

(52) U.S. Cl. ............... 455/423; 455/428; 455/446; 370/428; 370/250; 370/347

(58) Field of Classification Search ............ 455/428, 455/427, 423, 430, 433, 445, 12.1, 13.1, 455/414.1, 426.2, 446, 435.1, 435.2; 370/217, 370/222, 428, 250, 347; 714/4; 709/235, 709/231, 236
See application file for complete search history.

(56) References Cited

U.S. PATENT DOCUMENTS

| | | | | |
|---|---|---|---|---|
| 5,583,796 A | * | 12/1996 | Reese | 702/185 |
| 5,777,997 A | * | 7/1998 | Kahn et al. | 370/493 |
| 5,812,751 A | * | 9/1998 | Ekrot et al. | 714/4 |
| 5,829,019 A | * | 10/1998 | Thompson et al. | 711/113 |
| 5,959,945 A | * | 9/1999 | Kleiman | 455/3.06 |
| 6,038,594 A | * | 3/2000 | Puente et al. | 709/217 |
| 6,085,253 A | * | 7/2000 | Blackwell et al. | 709/235 |
| 6,219,546 B1 | * | 4/2001 | Valentine et al. | 455/428 |
| 6,438,707 B1 | * | 8/2002 | Ronstrom | 714/13 |
| 6,931,021 B1 | * | 8/2005 | Enari et al. | 370/428 |

* cited by examiner

*Primary Examiner*—Edward F. Urban
*Assistant Examiner*—John J. Lee
(74) *Attorney, Agent, or Firm*—Georgann S. Grunebach

(57) ABSTRACT

A method of performing primary service backups for a direct broadcast system is provided. The method includes establishing play-out of a plurality of primary events via a plurality of primary devices and establishing play-out of a plurality of backup events via at least one backup device. A controller switches from a primary device of the plurality of primary devices to a backup device of the at least one backup device in response to a malfunction signal from one of the plurality of primary devices. A direct server-based broadcast system and a direct port-based broadcast system are also provided which implement the above-stated method.

23 Claims, 4 Drawing Sheets

RISK-TIME PROTECTION BACKUP SYSTEM

TECHNICAL FIELD

The present invention relates generally to direct broadcast systems, and more particularly to a method and apparatus for risk prioritization and backup of primary servers within a direct broadcast system.

BACKGROUND OF THE INVENTION

Direct broadcast systems offer various different services including video and audio programming. Additional new services are continuously being offered for direct satellite broadcast system users. In order to offer these various services, multiple primary servers are controlled to transmit the audio and video programming over multiple channels and designated time frames.

Uninterrupted play-out of the audio and video programming is required in direct broadcast systems. In a direct broadcast environment every second of "airtime" is important and interrupted airtime can be costly. Airtime is especially important during pay-per-view and commercial time frames. When a commercial or pay-per-view event is interrupted for just one or two seconds, revenue is lost.

It is therefore critical that there be a backup scheme associated with each primary server. Typically, a one-to-one backup scheme is used. The one-to-one backup scheme includes operating a backup server in parallel with each primary server. With this configuration, when a failure occurs in a primary server, a backup server assumes the play-out role of the inoperative or improperly operating primary server. Thus, full redundancy exists in the event of failure of any or all of the primary servers.

The one-to-one backup scheme, however, has several associated disadvantages. Since there is a backup server or other backup device operating in parallel with each primary server the cost of providing, maintaining, and operating the backup broadcast system is relatively high. Additionally, in the event that both a primary server and an associated backup server malfunction simultaneously, there may be a large amount of downtime, sometimes several hours, before the primary server of interest is repaired/replaced or a second backup server is installed.

Also, backing up a group of primary servers with a backup tape is not a viable solution as there may be several minutes of delay in cueing the tape to point where the primary tape failure, before playback can occur. This is not tolerable, as even a mere 1 or 2 second delay can result in loss of customers and/or revenue.

Statistically there are times in programming in which typical malfunctions are more likely to occur such as the beginning portion of a program or commercial. There are also times where the cost of failure is higher than others. It is at these times when backup and the manner as to which the backup is performed is most critical. Existing backup systems do not account for the portion of a program or commercial that is at higher risk of failure or has a higher cost of failure in any different or better fashion than the remainder of the program or commercial.

It would therefore be desirable to minimize the number of backup servers and components within a direct broadcast system while also providing a backup system that minimizes downtime, virtually eliminates any switch over time, and takes into account the programming or portions of programming that have a high-probability or high cost of failure.

SUMMARY OF THE INVENTION

The present invention has several advantages over existing direct broadcast systems. One advantage of the present invention is that it provides a backup scheme in which a particular backup device is utilized to backup a plurality of primary devices. In doing so, the amount of direct broadcast system components that are needed to perform backups is minimized.

Another advantage of the present invention is that it incorporates risk-time management in determining, prioritizing, and scheduling, which primary events to backup. The present invention, thereby, initiates backups for primary events having the highest risk or cost of failure.

Furthermore, the present invention provides multiple backup devices for any one particular primary device, while maintaining a lower amount of backup devices as compared to the amount of primary devices currently used with a single direct broadcast system. The present invention, therefore, provides additional backup security over prior art systems.

Moreover, the present invention virtually eliminates switch over time between a primary device and a backup device, by providing parallel digital backup play-out for the primary device of interest.

The foregoing and other advantages are provided by a method and apparatus for risk prioritization and backup of primary devices within a direct broadcast system. A method of performing primary service backups for a direct broadcast system is provided. The method includes establishing play-out of a plurality of primary events through a plurality of primary devices and establishing play-out of a plurality of backup events through at least one backup devices. A controller switches from a primary device of the plurality of primary devices to a backup device of the at least one backup devices in response to a malfunction signal. A direct server-based broadcast system and a direct port-based broadcast system are also provided that implement the above-stated method.

The present invention itself, together with further objects and attendant advantages, will be best understood by reference to the following detailed description, taken in conjunction with the accompanying drawing.

BRIEF DESCRIPTION OF THE DRAWING

For a more complete understanding of this invention reference should now be had to the embodiments illustrated in greater detail in the accompanying figures and described below by way of example.

DETAILED DESCRIPTION OF THE PREFERRED EMBODIMENT

Figure 1:
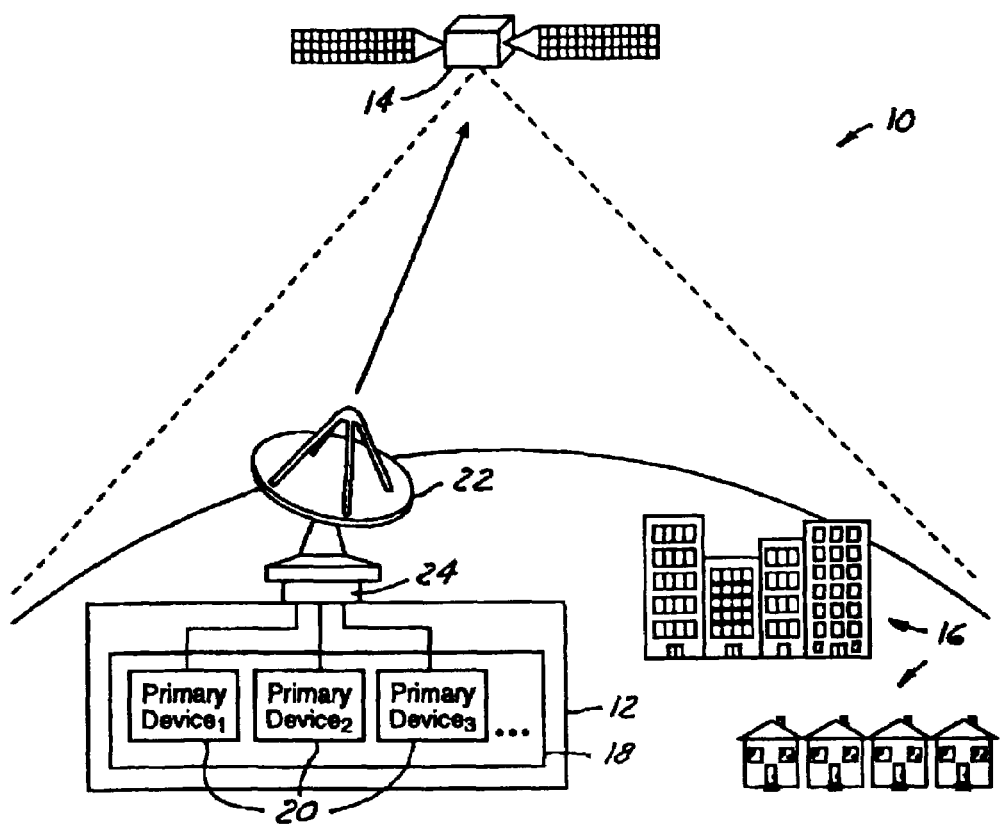
FIG. 1 is a perspective view of a direct broadcast system in accordance with an embodiment of the present invention.

While the present invention is described with respect to a method and apparatus for risk prioritization and backup of primary servers within a direct broadcast system, the following method is capable of being adapted for various purposes and applications, including direct broadcast systems, cable television networks, communication systems, digital or analog systems, or other terrestrial communication applications. It will be understood, however, that the present invention may be adapted to other applications In the following figures the same reference numerals are used to refer to the same components. Also, in the following description various operating parameters and components are described for one constructed embodiment. These specific parameters and components are included as examples and are not meant to be limiting.

Additionally, in the following description a programming device may be a primary server, a backup server, a primary port, a backup port, or other primary or backup system component.

Referring now to FIG. 1, a perspective view of a direct broadcast system 10 in accordance with an embodiment of the present invention is shown. The system 10 includes a ground station 12 for transmitting primary events and associated communication signals to at least one satellite 14. The at least one satellite 14 then retransmits the communication signals to multiple customer sites 16. The customer sites 16 preferably include both commercial and residential sites. The ground station 12 includes a direct broadcast backup system 18. The backup system 18 provides virtually instantaneous backup for a plurality of primary devices 20. Each primary device 20 is electronically coupled to transmission antenna 22 via a bus 24. The transmission antenna 22 is utilized in transmission of the primary events.

Figure 2:
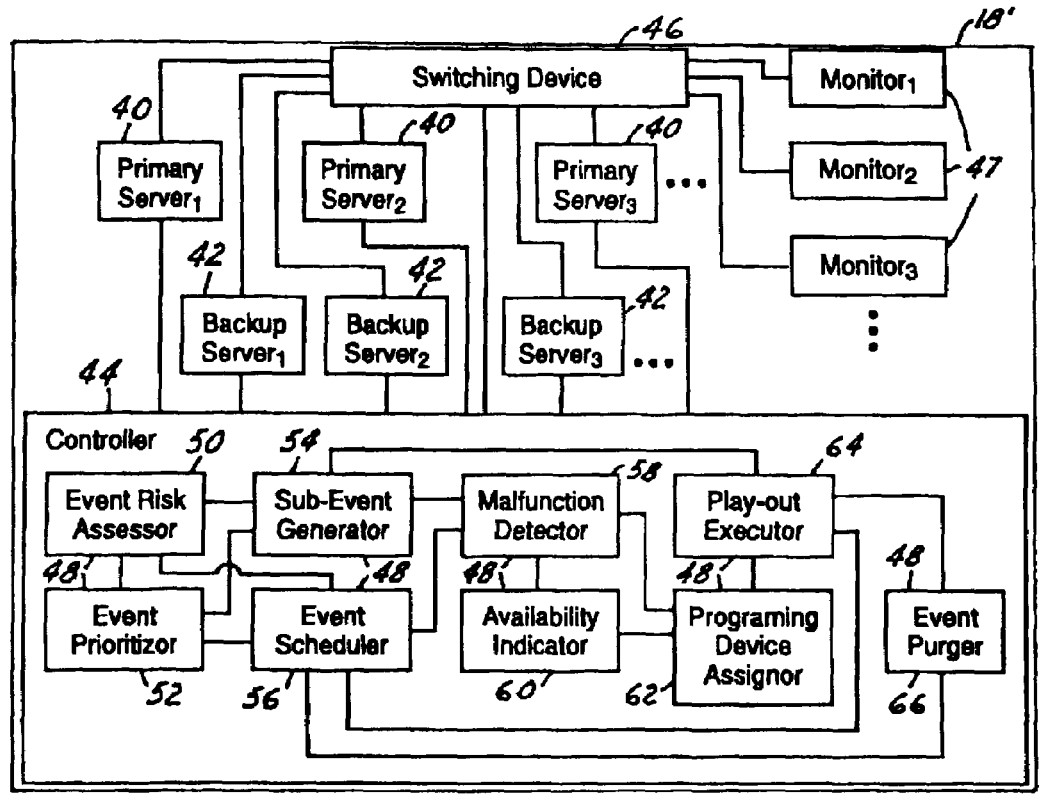
FIG. 2 is a block diagrammatic view of a direct server-based broadcast backup system in accordance with an embodiment of the present invention.

Referring now to FIG. 2, a block diagrammatic view of a direct server-based broadcast backup system 18' in accordance with an embodiment of the present invention, is shown. The backup system 18' includes a plurality of primary servers 40 and at least one backup servers 42. Each backup server provides parallel digital backup play-out for at least one of the primary servers 40. A controller 44 is electronically coupled to each primary server 40 and to each backup server 42. The controller 44 prioritizes and schedules the transmission of the primary events as well as the backup events. The primary events and the backup events may consist of any audio or video programming material. A switching device 46 is electronically coupled to the primary devices 40, the backup devices 42, the controller 44, and the bus 24. The controller 44 switches between the primary servers 40 and the backup servers 42 via the switching device 46. The primary events and the backup events are viewed via monitors 47 in communication with the switching device 46.

Each primary event may be segmented into sub-events or backup sub-events. Each backup sub-event may be a portion of a primary event or may be a full-length primary event. When a primary server malfunctions at a particular point in time, referred to as a failure point, a backup server 42 assumes play-out at a point in time as close as possible to the failure point. The point that the backup server 42 resumes play-out is referred to as a "mark-in" point. Since the present invention provides parallel digital backup play-out the failure point and the mark-in point are virtually the same. The backup server 42 continues to play-out from the mark-in point for a determined period of time, referred to as the restoration period. The restoration period is equal to the amount of time from the mark-in point until the time the primary server 40 is restored or replaced by an additional primary server 40 or a backup server 42. Each primary server 40 may perform as a backup server 42 and vice versa.

Each primary server 40 and each backup server 42 have associated recording devices or storage memories such as diskettes, VHS tapes, CDs, cassettes, RAM, ROM, or other video or audio recording or storage devices, known in the art. The primary servers 40 and the backup servers 42 are preferably digital or have digital event acquisition capability so as to reference a recording device at a particular point in time, which is refered to a particular memory location within a storage device, without time delay. Traditional backup systems required searching for a particular point in time through rewinding or fast forwarding of audio or video tapes, which results in time delay and lost earnings.

The controller 44 is preferably a microprocessor-based device such as a computer having a central processing unit, memory (RAM and/or ROM), and associated input and output buses. The controller 44 may be a portion of a central control unit or a stand-alone controller. The controller 44 includes various software based backup devices 48. Each backup device 48 may be an integral part of the controller 44, as stated, or may be an individual separate component from the controller 44.

The backup devices 48 include an event risk assessor 50, which determines the probability (risk level) of a primary device malfunctioning during a primary event or a portion of a primary event. An event prioritizor 52 is coupled to the risk assessor 50 and prioritizes each event or sub-event in response to the resulting risk levels that are associated with each event and sub-event. A sub-event generator 54 is coupled to the risk assessor 50 and the event prioritizor 52. The generator 54 generates sub-events, which are portions of or full-length redundancies of a primary event that has been interrupted or that has a high probability of being interrupted.

An event scheduler 56 is coupled to the risk assessor 50, the event prioritizor 52, and the generator 54. The scheduler 56 schedules the order of the generated sub-events in response to the risk levels and the priority levels associated with each event and sub-event. A malfunction detector 58 is coupled to the generator 54 and the scheduler 56 and detects malfunctions in primary devices as well as other direct broadcast system components. An availability indicator 60 is coupled to the detector 58 and continuously monitors and determines which programming devices are available at any instant in time.

A programming device assignor 62 is coupled to the detector 58 and the indicator 60 and assigns a programming device to play-out a certain event or sub-event in parallel with or in replacement of a primary device. A play-out executor 64 is coupled to the generator 54, the scheduler 56, and the assignor 62. The executor 64 establishes play-out of each event and sub-event. An event purger 66 is coupled to the scheduler 56 and the executor 64 and purges executed events or sub-events from memories of the primary servers 40, the backup servers 42, and the controller 44. The tasks performed by each of the backup devices 48 are explained in further detail below.

The switching device 46 may be an integral part of the controller 44 or the bus 24 or may be an individual stand-alone component as shown. The switching device 46 may be software or hardware based. The switching device 46 may also be composed of solid-state components or mechanical components.

The monitors 47 may be general monitors as illustrated or may be assigned to be primary monitors or backup monitors. The monitors 47 may display whether a programming device is currently in a risk-time protection mode or that a programming device is assigned for a risk-time protection.

Figure 3:
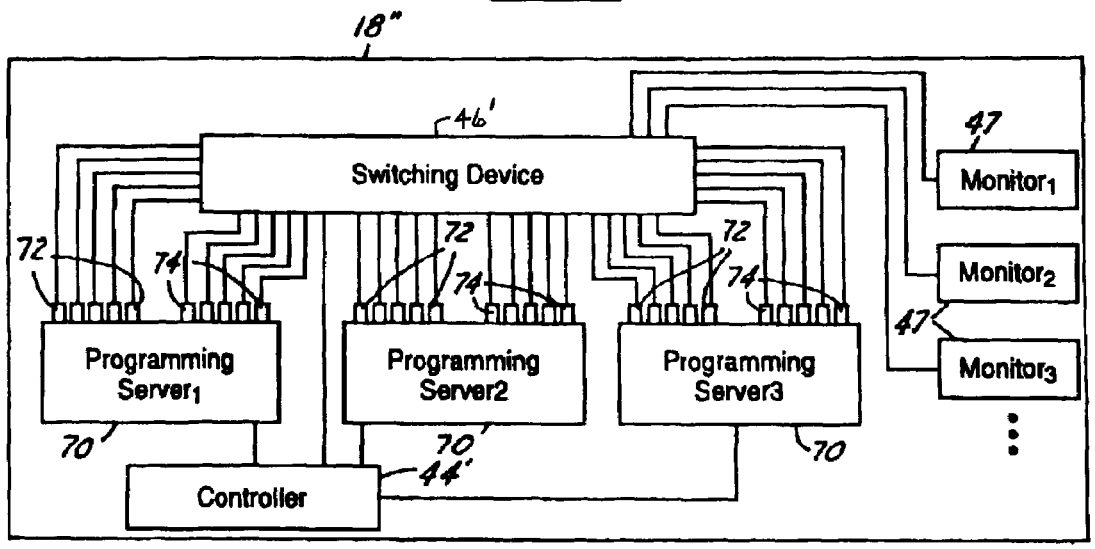
FIG. 3 is a block diagrammatic view of a direct port-based broadcast backup system in accordance with another embodiment of the present invention.

Referring now to FIG. 3, a block diagrammatic view of a direct port-based broadcast backup system 18" in accordance with another embodiment of the present invention, is shown. The port-based system 18" includes one or more programming servers 70. Each programming server 70 may have multiple primary ports 72 and multiple backup ports 74. A controller 44' is electronically coupled to the programming servers 70 and switches between the primary ports 72 and the backup ports 74 via a switching device 46'. The port-based controller 44' is similar to the server-based controller 44, but instead of switching between the primary servers 40 and the backup server 42, the port-based controller 44' switches between ports 72 and 74.

Referring now to FIGS. 4A, 4B, 4C, and 4D, the present invention provides four associating approaches for assigning backup devices to primary devices. From the aforementioned, a primary device may be a primary server, a primary port, or other primary video or audio programming device. Similarly, a backup device may be a backup server, a backup port, or other backup video or audio programming device. The four associated approaches are referred to as the group approach, the cluster approach, the shared approach, and the distribution approach.

Figure 4A:
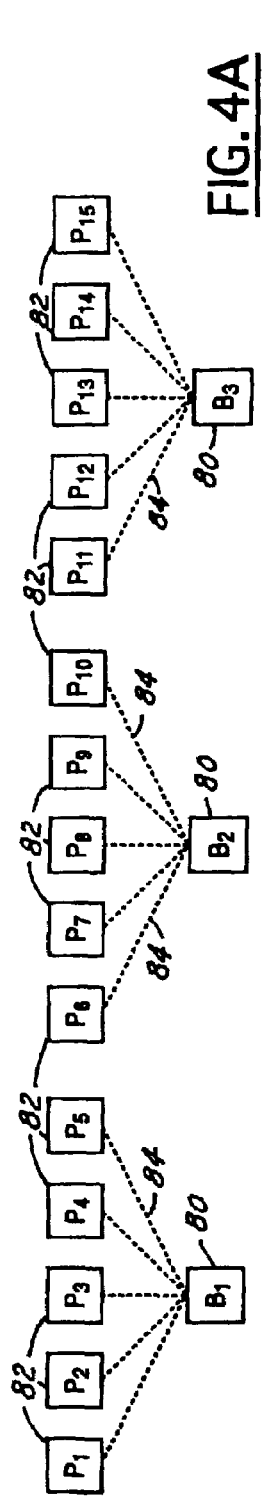
FIG. 4A is a block diagrammatic view of a group approach for programming devices, in accordance with an embodiment of the present invention.

Referring now to FIG. 4A, under the group approach each backup device 80 is assigned to a group of primary devices 82, as represented by dashed lines 84. For example, when 3 backup devices are assigned to 15 primary devices, a first backup device $B_1$ is assigned to a first group of primary devices consisting of five primary devices $P_1$–$P_5$. Backup devices $B_2$ and $B_3$ are assigned similar to $B_1$.

Figure 4B:
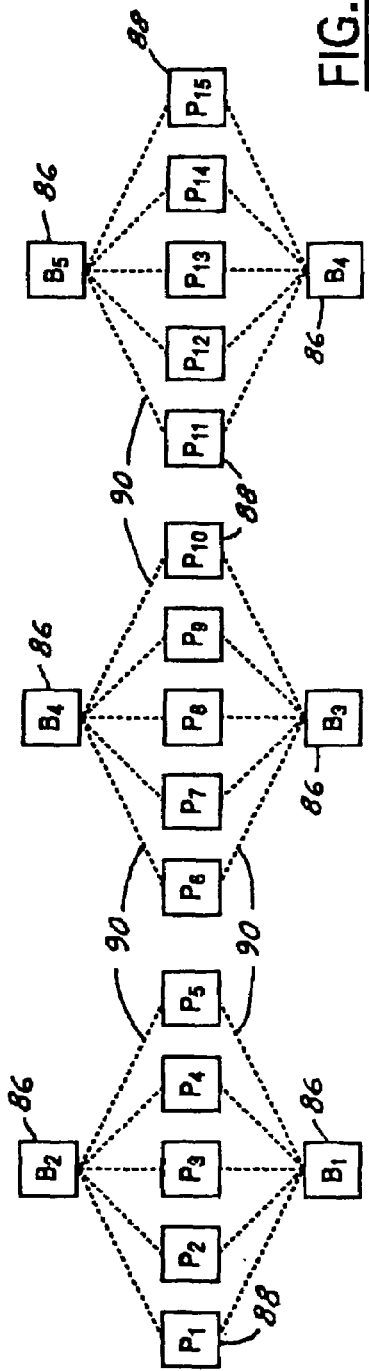
FIG. 4B is a block diagrammatic view of a cluster approach for programming devices, in accordance with another embodiment of the present invention.

Referring now to FIG. 4B, under the cluster approach more than one backup device 86 is assigned to each primary device 88, as represented by dashed lines 90. Therefore, by using the cluster approach versus using the group approach each primary device 88 has multiple possible backup devices 86 to assume play-out and thus additional malfunction protection. For example primary devices $P_1$–$P_5$ each have backup devices $B_1$ and $B_2$ associated therewith.

Figure 4D:
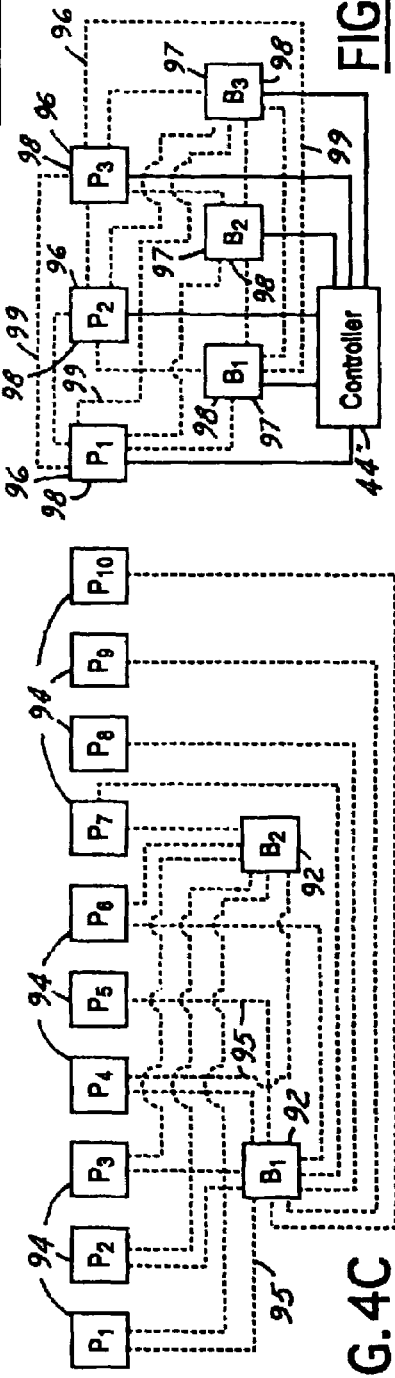
FIG. 4D is a block diagrammatic view of a distribution approach for programming devices, in accordance with another embodiment of the present invention.
Figure 4C:
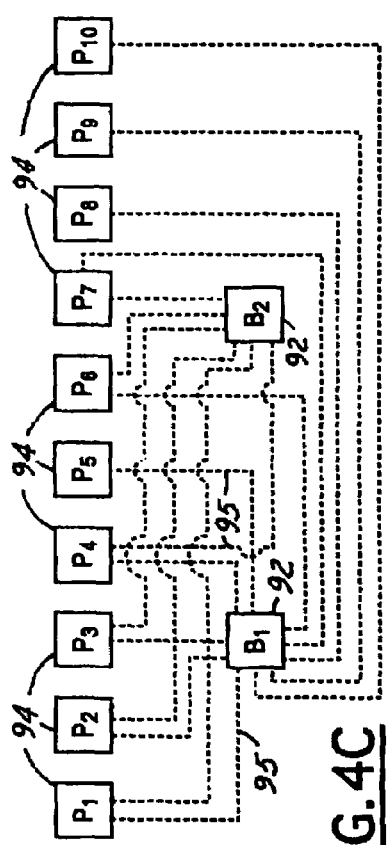
FIG. 4C is a block diagrammatic view of a shared approach for programming devices, in accordance with another embodiment of the present invention.

Referring now to FIG. 4C, under the shared approach all backup devices 92 are shared among each primary device 94, as represented by dashed lines 95. For example, when a direct broadcast system has 2 backup devices $B_1$ and $B_2$ assigned to 10 primary devices $P_1$–$P_{10}$, each of the primary devices has two possible associated backup devices. The shared approach has additional malfunction protection over both the group approach and the cluster approach.

Referring now to FIG. 4D, under the distributed approach a controller 44" determines and assigns or reassigns available designated primary devices 96 and designated backup devices 97 to perform as a primary device or as a backup device. In other words, the controller 44" perceives all backup devices 97 and primary devices 96 as programming devices 98. Each programming device 98 is either designated to perform as a primary device or as a backup device depending upon a situation or application and is associated with each of the other programming devices 98, as represented by dashed lines 99. The controller 44" using methods further described below, determines available programming devices 98 at any one particular time, prioritizes and schedules play-out of backup sub-events, and assigns appropriate available programming devices to play-out the backup sub-events accordingly.

Each of the above-described associated approach illustrations, given in FIGS. 4A–4D, are intended for example purposes only. Of course, there may be any number of primary devices and backup devices having varying associations or combinations, thereof.

Figure 5:
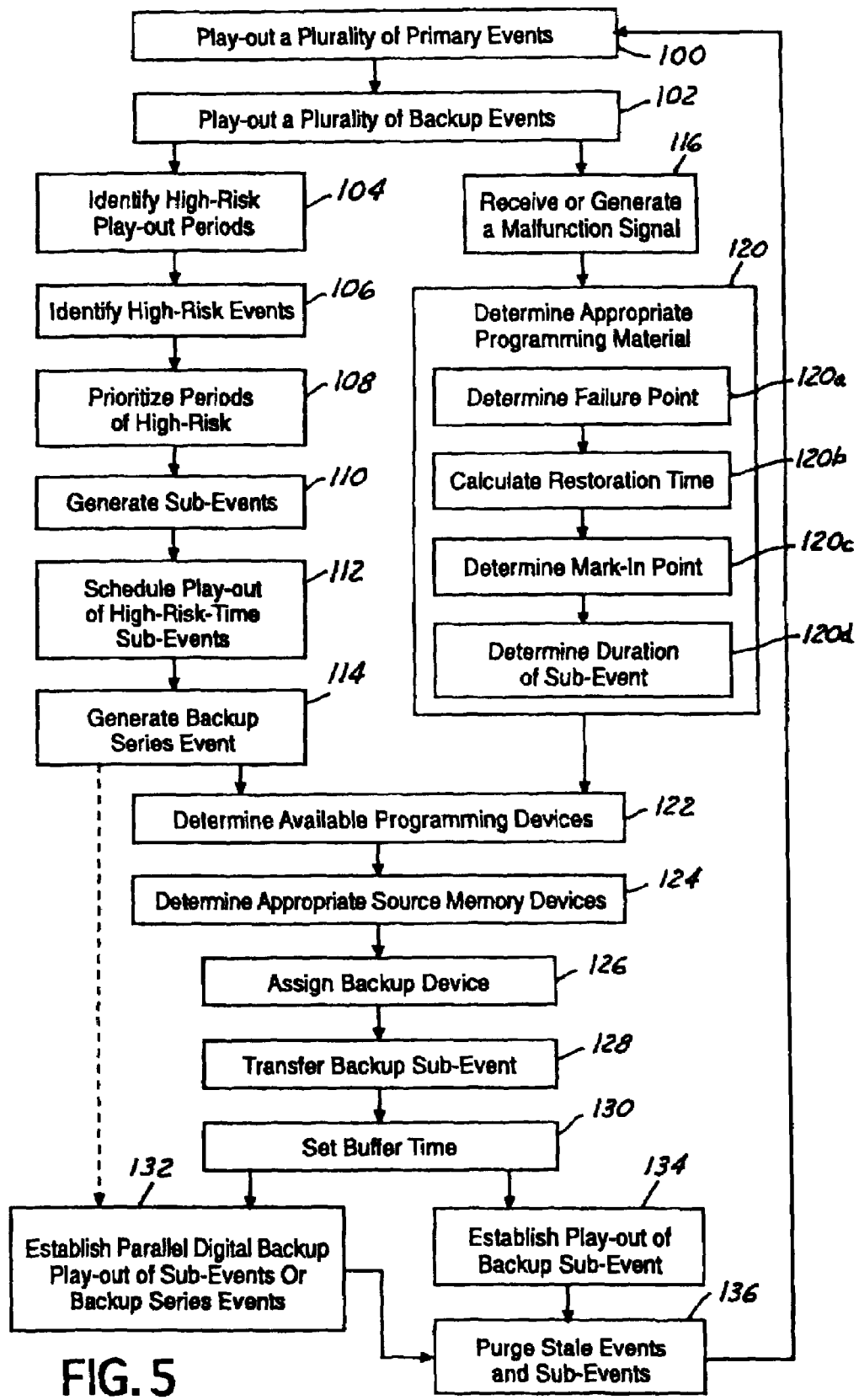
FIG. 5 is a logic flow diagram illustrating a method of performing primary service backups for a direct broadcast system in accordance with an embodiment of the present invention.

Referring now to FIG. 5, a logic flow diagram illustrating a method of performing primary service backups for the direct broadcast system 10 in accordance with an embodiment of the present invention, is shown.

The controllers 44, 44', and 44" continuously establish play-out of a plurality of primary events via a plurality of primary devices 40 and 72, as generally indicated by reference number 100.

The controllers 44, 44', and 44" also continuously establish play-out of a plurality of backup events via a play-out executor 64 and the backup devices 42 and 74, as generally indicated by reference number 102. The backup events are played-out in parallel to the primary events.

The event risk assessor 50 identifies events or sub-events that are potentially at high-risk, as generally indicated by reference number 104. The assessor 50 through the use of failure analysis identifies play-out periods of high-risk. Typically, the first portion of any primary event is considered a high-risk sub-event. High-risk sub-events are considered events when the probability of a malfunction occurring is high.

The assessor 50 identifies events that are deemed to be high-risk, as generally indicated by reference number 106. Critical programming material, that is considered to be high paying or considered to be a large event, such as commercials, Olympics, large sporting events, or other critical programming material may be considered in determining whether a sub-event is considered to be high-risk.

The event prioritizor 52 prioritizes the periods of high-risk, as generally indicated by reference number 108. The sub-events are backed-up according to a ranking of the risk levels of the corresponding periods. The prioritizor 52 may also consider programming material importance. For example, an event that attracts a large number of customers is of higher priority than an event that attracts a small number of customers.

The sub-event generator 54 generates a plurality of risk-time sub-events in response to the prioritization of the periods of high-risk, as generally indicated by reference number 110. High-risk-time sub-events, representing a redundant copy of a portion of the programming material that is being transmitted by the primary devices, are generated.

The event scheduler 56 schedules the backup devices to perform play-out of the high-risk-time sub-events according to risk ranking and prioritization, as generally indicated by reference number 112.

The generator 54 may generate a backup series event containing a series of the risk-time sub-events, as generally indicated by reference number 114. The sub-events in the backup series event are in order of risk ranking and prioritization level.

The malfunction detector 58 receives or generates a malfunction signal, as generally indicated by reference number 116. The malfunction signal contains information indicating that a programming device is operating inappropriately, is inoperable, or is transmitting improper programming material or unclear programming material. Unclear programming material may include material that contains imperfections, noise, errors, interference, or other unclarities known in the art. The malfunction signal may be generated internal to the controllers 44, 44', and 44" or external to the controllers 44, 44', and 44".

The generator 54 determines appropriate programming material for a particular sub-event, as generally indicated by reference number 120.

The generator 54 also determines the failure point of a primary device event, as generally indicated by reference number 120a, and as described above.

The generator 54 additionally calculates the restoration time for the particular sub-event of interest, as generally indicated by reference number 120b.

The mark-in point is determined by the generator 54 and is set to equal or be as close as possible to the failure point so as to prevent any time delay during switch over between the primary device and the backup device, as generally indicated by reference number 120c.

The duration of the sub-event is determined, as generally indicated by reference number 120d. The duration of the event that needs to be moved or available at the assigned backup device is calculated. The duration is dependent on how long the assigned backup device is available, as well as, how much storage space is available corresponding to that assigned backup device.

Note there are several advantages of performing high-risk assessment for programming material and events. By performing high-risk assessment primary events do not need to have full-length media backup. Sub-events can be captured for periods of high-risk and played-out as necessary. High-risk assessment allows for smaller backup system storage devices. Furthermore, many sub-events may be stored on or in any one particular storage device, saving component costs. The storage and play-out of several high-risk-time sub-events further allows a single backup device to backup multiple primary devices.

The availability indicator 60 determines which programming devices are available to perform as backup devices, as generally indicated by reference number 122. The indicator 60 continuously monitors all programming devices so as to have continuously updated knowledge of the availability of each programming device. The indicator 60 may simply choose a preassigned backup device that is associated with the particular primary device of interest or may actually search all programming devices to determine which devices are available. Programming device availability ratios and statistics are available to an operator. The availability ratios are simply the ratio of primary devices assigned to devices available for backup. The availability ratios provide average backup ratios over a period of time or an exact ratio for a given time and allow an operator to determine a level of redundancy desired. The indicator 60 or the controllers 44, 44', and 44" may move events around from programming device to programming device as necessary.

The programming device assignor 62 determines an appropriate source-memory device of the sub-event, as generally indicated by reference number 124. The source-memory device may be a storage device or memory located within the malfunctioning primary device, a backup device containing the same potentially interrupted primary event, or other programming device or component.

The assignor 62 also assigns a backup device from the available backup devices to play-out the programming material within the primary event. The assignor 62 or the assigned backup device searches for an alternative backup device to continue the potentially interrupted primary event when the assigned backup device has concluded play-out of the backup sub-event, as generally indicated by reference number 126.

The play-out executor 64 transfers the backup sub-event from the source-memory device to the assigned backup device, as generally indicated by reference number 128. The transfer is initiated from the mark-in point and lasts for the duration or restoration period calculated above.

When necessary, the executor 64 sets a buffer time, as generally indicated by reference number 130. The backup sub-event that is being transferred is to be played-out at a current time plus the buffer time. The buffer time is a very small amount of time, which is unnoticeable to the average customer. The buffer time is approximately less than 100 milliseconds in length. The buffer time is set to allow significant time for the switching device 46 to switch the assigned backup device to air before beginning play-out.

The play-out executor 64 establishes parallel digital backup play-out of the risk-time sub-events or the backup series event, as generally indicated by reference number 132 and following from task 114. The above tasks 122–130 are optional when following from task 114, which is represented by arrow 133.

The executor 64 establishes digital backup play-out of the backup sub-event, as generally indicated by reference number 134 and following from task 120. The primary device of interest is switched over to the assigned backup device. The play-out of the sub-event may occur from the assigned backup device, the programming source device, or from another available programming device. The backup sub-event or the plurality of risk-time sub-events are played-out in tandem with play-out of said plurality of primary devices, wherein play-out duration of said plurality of risk-time sub-events is equal to the duration of the periods of high-risk and not equal to the play-out duration periods of corresponding primary events. Of course, an operator may manually switch the primary device of interest to the assigned backup device or to another desired backup device.

The event purger 66 continuously purges any stale events and stale sub-events to free up available recording or storage space on the primary devices and the backup devices, as generally indicated by reference number 136. The term "stale" refers to events or sub-events that are no longer to be played-out or have already been played-out. The term "stale" may also refer to events or sub-events that are not to be played-out in the immediate future or are low in priority.

An operator may also request the controllers 44, 44', and 44" to "free-up" a programming device so as to perform maintenance or other desired tasks. Upon completion of maintenance, the operator may allow repaired equipment to be reinstalled as primary devices or backup devices.

The above-described steps are meant to be an illustrative example; the steps may be performed synchronously or in a different order depending upon the application.

The present invention provides a direct broadcast backup system that provides multiple backup devices for any particular primary device, while at the same time having less backup devices than primary devices. The present invention also provides one-to-one backup for periods of high-risk of a malfunction. In doing so, the present invention provides virtually instantaneous switch over between a primary device and a backup device, thereby providing a robust backup system.

The above-described method, to one skilled in the art, is capable of being adapted for various purposes and is not limited to the following applications: direct broadcast systems, cable television networks, communication systems, digital or analog systems, or other terrestrial communication applications. The above-described invention may also be varied without deviating from the true scope of the invention.

What is claimed is:

1. A direct server-based broadcast backup system comprising:
   a plurality of primary devices generating primary programming events for at least one customer;
   a plurality of backup devices electronically coupled to said plurality of primary devices and generating backup programming events; and
   a controller electronically coupled to said plurality of primary devices and said plurality of backup devices, selecting which of said primary programming events to backup, and switching and selecting at least one of said plurality of backup devices to operate in replacement of at least one of said plurality of primary devices in response to said selected primary programming events and a malfunction signal from one of said plurality of primary devices.

2. A system as in claim 1 wherein at least one primary device of said plurality of primary devices is associated with one backup device of said plurality of backup devices.

3. A system as in claim 1 wherein said plurality of primary devices form at least one cluster, and wherein each of said clusters is associated with at least one of said plurality of backup devices.

4. A system as in claim 1 wherein said plurality of backup devices is in parallel operation with said plurality of primary devices.

5. A system as in claim 1 wherein said malfunction signal is generated internal to or external of said controller.

6. A system as in claim 1 wherein said malfunction signal is generated from at least one of: said plurality of primary devices, said at least one backup device, said controller, and a direct broadcast system fault detecting component.

7. A system as in claim 1 wherein said plurality of backup devices are associated with at least one of said plurality of primary devices.

8. A system as in claim 1 comprising a server comprising said plurality of backup devices.

9. A system as in claim 8 wherein said plurality of backup devices comprise a plurality of backup ports.

10. A system as in claim 1 wherein said controller purges state events and stale sub-events.

11. A direct port-based broadcast backup system comprising:
    at least one dual purpose server providing programming to at least one customer and wherein at least one of said at least one dual purpose server comprising a plurality of programming ports, said programming ports comprising:
       a plurality of primary ports supplying primary programming events; and
       at least one backup port supplying backup programming events; and
    a controller electronically coupled to said at least one dual-purpose server and switching between said plurality of primary ports and said at least one backup port in response to a malfunction signal.

12. A system as in claim 11 wherein said plurality of programming ports are capable of performing as a primary port or a backup port.

13. A system as in claim 11 wherein said controller in switching between said plurality of primary ports and said at least one backup port determines which of said plurality of programming ports are available.

14. A system as in claim 11 wherein said controller locates the appropriate programming material on a first programming server and transfers said appropriate programming material to a second programming server that comprises a backup port.

15. A system as in claim 11 wherein said controller continuously monitors status of said plurality of programming ports.

16. A method of performing primary service backups for a direct broadcast system comprising:
    establishing play-out of a plurality of primary events via a plurality of primary devices;
    establishing play-out of a plurality of backup events via at least one backup device;
    switching from a primary device of said plurality of primary devices to a backup device of said at least one backup device in response to a malfunction signal;
    detecting an error and generating a malfunction signal;
    determining which backup devices of said at least one backup device are available;
    determining appropriate programming material; and
    assigning a backup device of said available backup devices to play-out said programming material.

17. A method as in claim 16 further comprising:
    generating a sub-event of said programming material; and
    establishing play-out of said sub-event via said assigned backup device.

18. A method as in claim 17, wherein assigning a backup device comprises searching for an alternative backup device to continue a primary event when said assigned backup device has concluded playing-out said sub-event.

19. A method as in claim 17 further comprising:
    determining point of failure on a primary device event;
    calculating restoration time;
    determining mark-in point;
    determining duration of said sub-event;
    determining source device of said sub-event;
    establishing play-out of said sub-event via said source device.

20. A method as in claim 19 further comprising:
    transferring said sub-event from said source device to said assigned backup device;
    setting a buffer time; and
    establishing play-out of said sub-event via said assigned backup device at a current time plus said buffer time.

21. A method as in claim 17 further comprising:
    identifying high-risk events;
    identifying periods of high-risk for said high-risk events;
    prioritizing said periods of high-risk;
    generating a plurality of risk-time sub-events in response to said prioritization of said periods of high-risk;
    scheduling said at least one backup device to play-out said plurality of risk-time sub-events; and
    establishing play-out of said plurality of risk-time sub-events on said at least one backup device in tandem with play-out of said plurality of primary devices.

22. A method as in claim 21 further comprises:
    generating a backup event comprising a series of said plurality of risk-time sub-events; and
    establishing play-out of said backup event.

23. A method as in claim 21 wherein play-out duration of said plurality of risk-time sub-events is equal to duration of said periods of high-risk and not equal to play-out duration periods of corresponding primary events.

* * * * *